US010458549B2

(12) United States Patent
Baumann et al.

(10) Patent No.: US 10,458,549 B2
(45) Date of Patent: Oct. 29, 2019

(54) SEAL ASSEMBLY FOR SEALING A SPACE BETWEEN A HOUSING AND A COMPONENT AGAINST ENTRY OF A LIQUID MEDIUM

(71) Applicants: Michael Baumann, Aberdeenshire (GB); Christian Kogler, Oberkurzheim (AT)

(72) Inventors: Michael Baumann, Aberdeenshire (GB); Christian Kogler, Oberkurzheim (AT)

(73) Assignee: Aktiebolaget SKF, Göteborg (SE)

( * ) Notice: Subject to any disclaimer, the term of this patent is extended or adjusted under 35 U.S.C. 154(b) by 463 days.

(21) Appl. No.: 15/159,999

(22) Filed: May 20, 2016

(65) Prior Publication Data

US 2016/0341316 A1 Nov. 24, 2016

(30) Foreign Application Priority Data

May 22, 2015 (DE) .................. 10 2015 209 428

(51) Int. Cl.
| | | |
|---|---|---|
| *F16J 15/32* | (2016.01) | |
| *F16J 15/3232* | (2016.01) | |
| *F03B 11/00* | (2006.01) | |
| *F16J 15/00* | (2006.01) | |

(Continued)

(52) U.S. Cl.
CPC ......... *F16J 15/3232* (2013.01); *F03B 11/006* (2013.01); *F16J 15/002* (2013.01);
(Continued)

(58) Field of Classification Search
CPC .... F16J 15/02; F16J 15/32; F16J 15/00; F16J 15/16; F16J 15/34; F16J 15/18
See application file for complete search history.

(56) References Cited

U.S. PATENT DOCUMENTS 3,413,008 A * 11/1968 Greiner ................. B63H 23/36
277/505
3,563,555 A * 2/1971 Koons ................. F16J 15/3272
277/309

(Continued)

FOREIGN PATENT DOCUMENTS

| CN | 1030633 A | 1/1989 |
|---|---|---|
| CN | 103835862 A | 6/2014 |

(Continued)

*Primary Examiner* — Vishal A Patel
(74) *Attorney, Agent, or Firm* — Bryan Peckjian; SKF USA Inc. Patent Dept.

(57) ABSTRACT

A seal assembly for sealing a space between a housing and a component against a liquid medium includes a seal element fixedly connectable to the housing, the seal element including a seal lip that is movable at least in a radial direction, the seal lip being disposed at an angle with respect to the radial direction and a support element in abutment with the seal lip. The support element and the seal element are configured such that a pressure exerted on the seal lip by the liquid medium is transmittable in the radial direction to the support element, and the seal assembly also includes a further seal assembly on a side of the support element axially opposite the seal element, the further seal assembly including a first seal having a first seal body and a second seal having a second seal body.

9 Claims, 3 Drawing Sheets

(51) Int. Cl.
*F16J 15/3216* (2016.01)
*F16J 15/322* (2016.01)

(52) U.S. Cl.
CPC ......... *F16J 15/322* (2013.01); *F16J 15/3216* (2013.01); *Y02E 10/226* (2013.01)

(56) References Cited

U.S. PATENT DOCUMENTS

| | | | |
|---|---|---|---|
| 4,168,070 A | | 9/1979 | Tsuchihashi et al. |
| 5,643,026 A | * | 7/1997 | Pietsch ............... B63H 23/321 |
| | | | 277/320 |
| 6,481,720 B1 | * | 11/2002 | Yoshida ............... B63H 23/321 |
| | | | 277/400 |
| 10,030,776 B2 | * | 7/2018 | Baumann ............... F16J 15/004 |
| 2004/0245728 A1 | * | 12/2004 | Armour ............... F16J 15/324 |
| | | | 277/549 |
| 2013/0277919 A1 | | 10/2013 | Himeno et al. |

FOREIGN PATENT DOCUMENTS

| | | |
|---|---|---|
| CN | 203756417 U | 8/2014 |
| CN | 105464882 A | 4/2016 |
| DE | 3800706 A1 | 7/1989 |
| DE | 4017335 A1 | 12/1991 |
| DE | 19904761 A1 | 9/2000 |
| EP | 0671321 A1 | 9/1995 |
| EP | 1256518 A | 11/2002 |
| GB | 2140880 A | 12/1984 |
| GB | 2213882 A | 8/1989 |
| JP | 2003026094 A | 1/2003 |
| WO | 2011062484 A2 | 5/2011 |

* cited by examiner

SEAL ASSEMBLY FOR SEALING A SPACE BETWEEN A HOUSING AND A COMPONENT AGAINST ENTRY OF A LIQUID MEDIUM

CROSS-REFERENCE TO RELATED APPLICATIONS

This application claims priority to German patent application no. 10 2015 209 428.6 filed on May 22, 2015, the contents of which are fully incorporated herein by reference.

TECHNOLOGICAL FIELD

The present exemplary embodiments are directed to the field of seal assemblies, in particular seal assemblies for sealing a space between a housing and a component against the entry or exit of a liquid medium.

BACKGROUND

In many fields of technology seal systems are used to seal parts or components, for example, from contaminants or corrosion. Thus various seal systems can be used in the field of underwater power plants. In many cases seals are used in association with rotatable or pivotable parts for protecting components of those parts. However, when a liquid medium is under high pressure, that pressure can exert high forces on seals and on sliding surfaces in contact therewith. This in turn can result in mutual wear on these components within a short time and thus the sealing effect can be impaired. Seal replacement may be complex or cost-intensive, or under certain circumstances may be impossible or nearly impossible to perform. In addition, in fields other than underwater applications, conditions may prevail under which seal systems are subjected to high pressures and thus can wear quickly.

SUMMARY

It is therefore desirable to provide an improved and reliable seal arrangement for sealing against passage of a liquid medium.

According to a first aspect of the disclosure, exemplary embodiments relate to a seal assembly for sealing a space between a housing and a component against a liquid medium. The seal assembly comprises a seal element fixedly connectable to the housing, which seal element includes a seal lip that is movable at least in a radial direction. The seal lip is disposed at an angle to the radial direction. The seal assembly additionally comprises a support element that is in abutment with the seal lip. Here a pressure exerted on the seal lip by the liquid medium is transmissible in the radial direction to the support element. A contact force on a counter-surface of the component, which contact force is caused by the pressure of the medium, can thereby be reduced, and thus an abrasion of the seal lip may be reduced, or also a possible pushing-through of the seal lip in the axial direction can be prevented (that is, the seal lip can be axially reinforced). This can also reduce wear on the counter-surface. Maintenance processes can therefore possibly occur less frequently, and costs can therefore be reduced.

In some exemplary embodiments the support element has a greater rigidity compared to the seal element. This may strengthen a supporting opposing force on the seal lip, which opposing force is directed against the contact force, and thus maintain a sealing effect.

In some exemplary embodiments the support element is formed one-piece with the housing. Under certain circumstances a manufacturing process can thereby be simplified.

In some exemplary embodiments the support element extends less far radially towards an axis of symmetry of the seal element than the seal lip. A more reliable connection of the seal lip to a counter-surface, and thus an improved seal effect, can thereby be achieved.

In some exemplary embodiments the seal assembly further comprises a further seal assembly on a side of the support element facing away (opposite) from the seal element. Here the further seal assembly and the seal element delimit a volume. The volume is accessible via a bore for discharging a medium located in the volume. Thus the seal assembly can form a collection space for leaking fluid, so that a penetration of fluid leaking through the seal element may be detected or remedied before it reaches the to-be-sealed space where it could cause damage.

In some exemplary embodiments the bore extends through the support element and/or the housing. It may thus be possible to connect a radially-outer-lying leakage tank via which leakage liquid can be guided back to the medium. Because the tank is radially outer lying, it may be more easily accessible.

In some exemplary embodiments the further seal assembly comprises a first seal including a first seal body and a second seal including a second seal body. Here an axial extension of the first seal body and an axial extension of the second seal body may differ from each other and/or differ from an axial extension of a body structure of the seal element. This can allow an operator to exchange the first seal, the second seal, or the seal element with one another in their positions such that after the exchange their seal lips abut on a counter-surface at a different position than before the exchange. Wear on the counter-surface can thus be shifted in location, and the need for maintenance may be delayed.

In some exemplary embodiments the further seal assembly comprises a first seal and a second seal. The first seal includes a first seal lip, and the second seal includes a second seal lip. Here the first and the second seal lips face in axially opposite directions from each other. A sealing effect can thus be provided against the medium and also against any lubricant located in the to-be-sealed space. Undesired escape of lubricant can thus also be prevented.

In some exemplary embodiments the housing includes a radially extending support surface including an undercut for providing a friction-fit connection to the further seal assembly. An improved retention of the seal can thus be made possible, and malfunctioning due to undesired slippage may be prevented.

Some exemplary embodiments relate to a turbine hub. The turbine hub comprises a shaft for pivotably supporting a turbine blade with respect to the turbine hub. The turbine hub additionally comprises a seal assembly of the above-mentioned type. Here the seal element of the seal assembly seals against the shaft using the seal lip. This can allow, for example, a use of the seal assembly in the field of underwater power plants.

BRIEF DESCRIPTION OF THE DRAWINGS

Further advantageous aspects of the disclosure are described in more detail below with reference to exemplary embodiments depicted in the Figures, but are not limited to said exemplary embodiments.

DETAILED DESCRIPTION

In the following description of the accompanying Figures, like reference numbers refer to like or comparable components. Furthermore, summarizing reference numbers are used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

Figure 1:
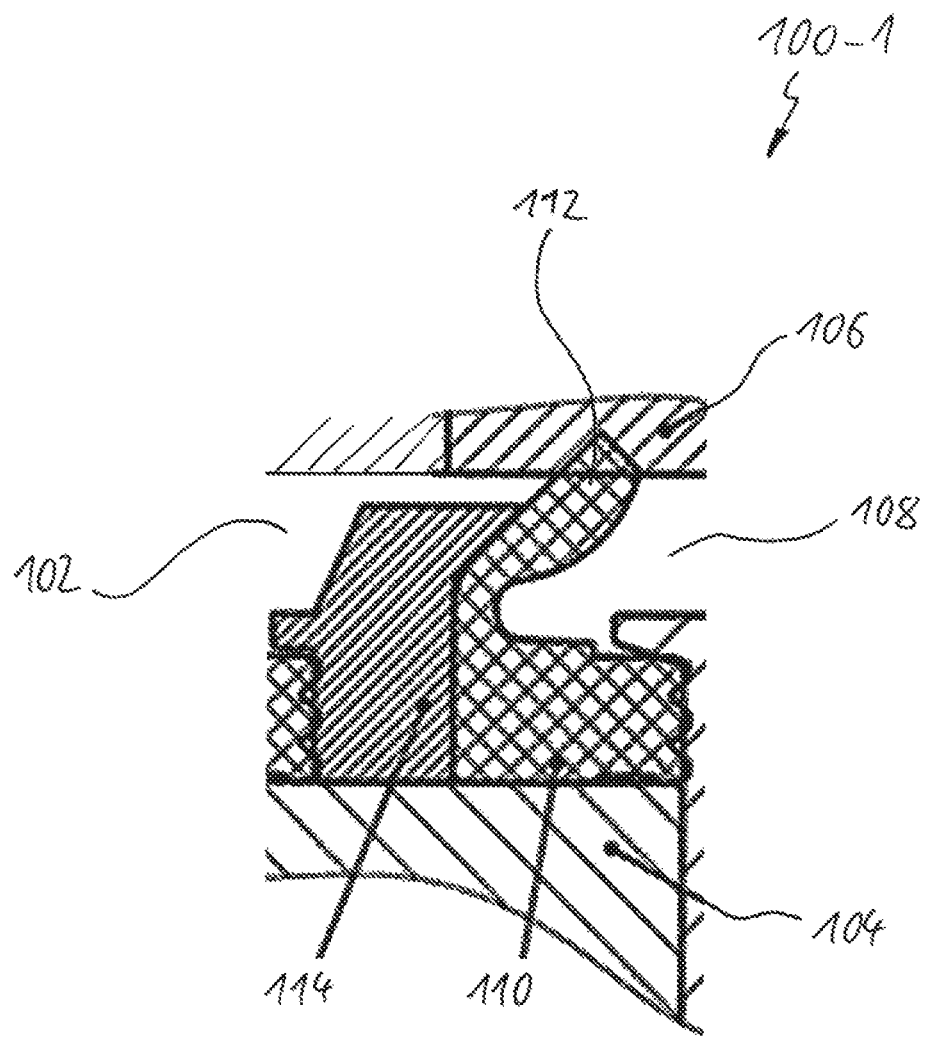
FIG. 1 shows a cross-section of a seal assembly according to an exemplary embodiment.

FIG. 1 shows an exemplary embodiment of a seal assembly 100-1 for sealing a space 102 between a housing 104 and a component 106 against a liquid medium 108. The seal assembly 100-1 comprises a seal element 110 fixedly connectable to the housing 104, which seal element 110 includes a seal lip 112 that is movable at least in a radial direction. The seal lip 112 is disposed at an angle to the radial direction. The seal assembly 100-1 additionally comprises a support element 114, which is in abutment with the seal lip 112. Here a pressure exerted on the seal lip 112 by the liquid medium 108 is transmissible in the radial direction to the support element 114.

Here the radial direction is perpendicular to an axial direction that points from the medium 108 to the space 102. Here the seal element 110 or the support element 114 can be configured rotationally symmetric with respect to the axial direction, or in other words annular. In another exemplary embodiment the seal can extend linearly along a spatial direction that is disposed perpendicular to the axial direction. Thus the term "axial" can refer to an x-axis of a three-dimensional Cartesian coordinate system, and the term "radial" to a y-axis or z-axis.

The seal assembly 100-1 can be configured such that it can be possible to offer an increased pressure resistance (for example, starting from 10 bar) and to correct or prevent any misalignments using a flexible or elastic seal lip 112. It can also be possible to use the seal assembly 100-1 with rotating assemblies of components and a pressure of at most 10 bar, for example, in hydroelectric power plants, mining equipment, or tunnel drills. The support element 114 can cause the seal element 110 to be held in its position, and a static seal by the seal lip 112, which can follow a possible movement of a counter-surface against the component 106, is improved. Here a use of an annular spring integrated in the seal lip 112, which can cause a weakening of the seal lip 112 due to a fitting groove or even damage to the counter-surface (e.g., shaft), can be avoided under certain circumstances. Due to the angle that the seal lip 112 forms with respect to the radial direction, it can be possible that the pressure of the medium presses the seal lip 112 against the component 106. This can be comparable to the effect of an integrated annular spring. In the exemplary embodiment shown here the angle is between approximately 40° and 50°, but can also deviate upward or downward.

The seal element 110 can comprise an elastomer. The seal element 110 can also comprise polyurethane (e.g. S-ECOPUR®). This may include solid lubricants that are comprised of a material structure. An abrasion of the seal element 110 during operation or wear can thereby be reduced, and further lubricant, for example, grease or oil may be omitted. Such a self-lubricating function or permanent flexibility with increased stiffness in comparison to, for example, rubber materials can support underwater usability.

In some exemplary embodiments the support element can have a greater stiffness compared to the seal element 110. For example, the support element 114 can include or be formed of a metal material. Spatial clearance can thereby be reduced, and a possible pushing-in or deforming avoided. The support element 114 can be reused after a possible exchange of the seal element 110.

In some exemplary embodiments the support element 114 extends less far radially towards an axis of symmetry of the seal assembly 100 than the seal element 110. In one exemplary embodiment the axis of symmetry relates to an annularly configured seal assembly 100. In another exemplary embodiment the support element 114 extends less far radially towards a counter-surface of the seal element 110 than the seal lip 112. A more reliable connection of the seal lip to a counter-surface, and thus an improved seal effect, can thereby be achieved.

Figure 2:
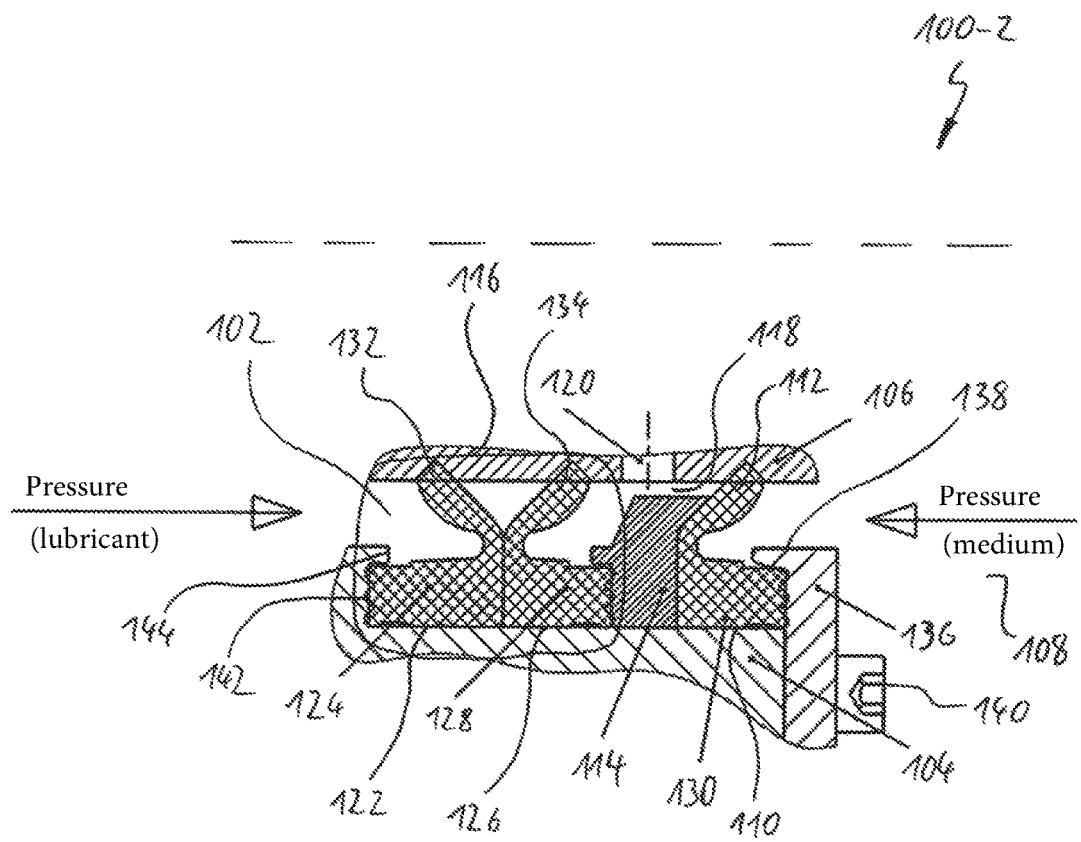
FIG. 2 shows a cross-section of a seal assembly in an installed state according to an exemplary embodiment.

FIG. 2 shows a further exemplary embodiment of a seal assembly 100-2. Components that correspond to a component described FIG. 1 are not described again here. Rather, only the differences are discussed. The seal assembly 100-2 includes a further seal assembly 116 on a side of the support element 114 that faces away from the seal element 110. Here the further seal assembly 116 and the seal element 110 delimit a volume 118. The volume 118 is accessible via a bore 120 for discharging a medium located the volume 118. An intermediate space can thus be provided, which has the volume 118 in which, for example, leakage water can be collected before it reaches the space 102. Penetrated medium can be guided out of the volume 118 by the bore 120 or detected using a moisture sensor or pressure sensor. Thus maintenances or repairs of the leakage can optionally be performed before the medium penetrates into the space 102. For example, the bore 120 can lead into a leakage tank, via which leakage liquid can be guided back to the medium. In FIG. 2 the bore 120 extends through the component 106, but in a further exemplary embodiment, which is explained below, the bore 120 can also extend through the support element 114 and/or the housing 104.

In some exemplary embodiments the further seal assembly 116 comprises a first seal 122 including a first seal body 124 and a second seal 126 including a second seal body 128. Here an axial extension of the first seal body 124 and an axial extension of the second seal body 128 differ from each other and/or differ from an axial extension of a body structure 130 of the seal element 110. In FIG. 2, for example, the axial extension of the first seal body 124 is greater than that of the second seal body 128, and the axial extension of the second seal body 128 is identical to that of the body structure 130 of the seal element 110. This can allow an operator to exchange the first seal 122, the second seal 126, or the seal element 110 with one another in their positions such that after the exchange a first seal lip 132 of the first seal 122 and a second seal lip 134 of the second seal 126 each abut on a counter-surface at a position that is different than their abutment positions before the exchange. In other words, the first seal lip 132 and the second seal lip 134 contact first and second locations on the counter surface before the exchange and contact third and fourth positions on the counter surface after the exchange, where all of the first, second, third and fourth locations are different. Wear on the counter-surface can thus be shifted in location, and the need for maintenance may thereby be delayed. Seal element 110, second seal 112, and first seal 126 are disposed, for example, in this order in an axial direction extending from the medium 108. After an exchange there can be a new sequence starting from the medium 108, for example, first seal 122, seal element 110, and second seal 126. In a further exemplary embodiment including more than two seals or seal elements 110, an exchange of two seals with one another can cause a position of more than two, or even all, of the seal lips of the assembly to change.

In another exemplary embodiment only the spacing of the first seal lip 132 from a radially extending end surface of the first seal 122 may differ from the spacing of the second seal lip 134 from a radially extending end surface of the second seal 126. Thus an exchange of the first seal 122 with the second seal 126 can cause a position of the first seal lip 132 and of the second seal lip 134 to change, but the position of a further seal lip might possibly be maintained.

The first seal 122 additionally includes a first seal lip 132, and the second seal 126 additionally includes a second seal lip 134. Here the first seal lip 132 and the second seal lip 134 face in axially opposite directions from each other. Thus the second seal lip 134 may have a sealing effect against a possibly penetrating medium, and the first seal lip 132 may have a sealing effect against any lubricant located in the to-be-sealed space 102. The force effects of the respective pressures of the medium 108 and the lubricant are depicted as arrows in FIG. 2 and can effect a contact force of the first seal lip 132 or second seal lip 134 increasing proportionally to the pressure. Undesired escape of lubricant into the medium 108, and environmental damage possibly resulting therefrom, can thus also be prevented.

The seal assembly 100-2 further comprises a cover plate 136 including an undercut 138. The cover plate 136 can be connected in a reversibly connectable manner to the housing 104 using an attachment device 140, for example, a screw. After the connecting a friction-fit connection of the seal element 110 to the housing 104 is provided by the undercut 138. Thus in order to make possible a friction-fit connection (press-fit), an outer radius of the undercut 138 can be somewhat larger than an inner radius of the body structure 130. The terms "outer" and "inner" here can refer to an axially extending central axis drawn as a dashed line. The central axis can be parallel to the axial direction or coincide therewith.

In FIG. 2 the housing additionally includes a radially extending support surface 142 including an undercut 144 for producing a friction-fit connection to the further seal assembly 116. Thus an improved retention of the seal assembly 116 can be made possible, and a malfunctioning due to undesired slippage may be avoided. A friction-fit connection here between, for example, the first seal ring 122 or the seal element 110 to the housing can act as described in the radial direction, or also between the cover plate 136 and the support surface 142 in the axial direction.

Figure 3:
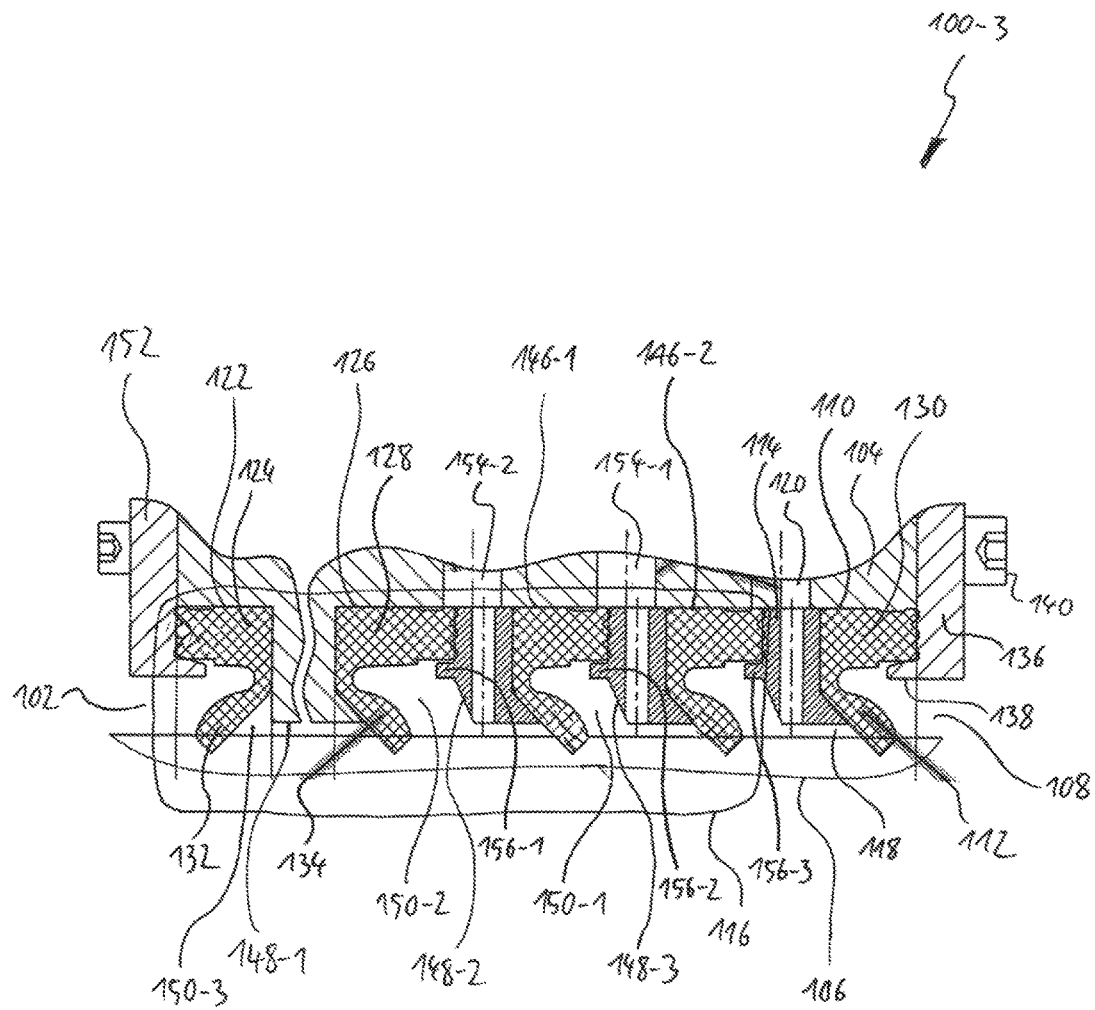
FIG. 3 shows a cross-section of a seal assembly in an installed state according to a further exemplary embodiment.

FIG. 3 shows a further exemplary embodiment of a seal assembly 100-3. In contrast to the embodiment of FIG. 2, the further seal assembly 116 here includes further seals 146-1; 146-2. These seals are identical in construction to the seal element 110 but may differ with respect to materials used or with respect to their axial extensions. Further support elements 148-1; 148-2; 148-3; 148-4 are respectively introduced between the first, the second, and the further seals 122; 126; 146-1; 146-2. Here the further support elements 148-2; 148-3 are identical in construction to the support element 114. By way of example, the further support element 148-1 is formed one-piece with the housing 104. In some exemplary embodiments the support element 114 can also be formed one-piece with the housing. Furthermore, due to the seals 122; 126; 146-1; 146-2 additional volumes 150-1; 150-2; 150-3 are respectively formed therebetween. The first seal 122 can be clamped independently of further seals 126; 146-1; 146-2, and therefore positional misalignments due to manufacturing tolerances can be avoided. The first seal 122 can make possible a reduction of the space 102 and thus a reduction of the amount of lubricant located therein, and retain the lubricant in the space 102.

The second seal body 128 of the second seal 126 has a greater axial extension than the further seals 146-1; 146-2 or the body structure 130 of the seal element 110. During maintenance or seal replacement the seal element 110 can, for example, be exchanged with the second seal 126. Thus the seal assembly 100-3 can be displaced with respect to the component 106 (by, for example, a few mm) towards the space 102. Thus contact surfaces between seal lips of the individual seals and the counter-surface of the component 106 can move, or, in other words, still-unused sections of the counter-surface can serve as new counter-surfaces for the seal lips. A service life for the counter-surface can thus possibly be increased, for example doubled.

The seal assembly 100-3 is modularly configured, and the seals 110; 122; 126; 146-1; 146-2 are each supported by a support element 114; 148-1; 148-2; 148-3, which can reduce or prevent deformations or friction. The seals 110; 122; 126; 146-1; 146-2 are fixed in their position by axial clamping-together of a cover plate 136 and an identically constructed further cover plate 152 mounted on a side facing away from the cover plate 136. The undercut 138 is tapered such that here the seal element 110 is pressed against the housing. Even when using segmented cover plates 136; 152 this can lead to an improved retention of the seal assembly 100-3. In addition, due to a preloading of the seal material (interaction between seal lip and counter-surface) the seals 110; 122; 126; 146-1; 146-2 each press against the component 106. Here friction or wear can only occur to a limited degree. The support elements 114; 148-1; 148-2; 148-3 can each optionally include an undercut or a projection 156-1; 156-2; 156-3, which can extend obliquely or parallel to a central axis of the seal assembly 100-3. The projection 156-1; 156-2; 156-3 can serve in a manner comparable to that of the undercut 138 for producing a friction-fit connection to an adjacent seal by clamping in the radial direction. The adjacent seal thus clamped can thus differ from a seal whose seal lips are adjacent to the support element 114; 148-1; 148-2; 148-3.

During operation the seal assembly 100-3 can be immersed in water so that the seal element 110 is subjected to a pressure by the water. Here the seal lip is pressed against the counter-surface, and contact forces or friction forces increase. Wear in the form of abrasion can thereby occur on the seal lip 112. The amount of wear per unit of time can depend on the pressure. In addition, the seal element 110 can come into contact with aggressive or abrasive particles in the water (sand, suspended solids, etc.). This can damage the seal lip 112 such that water can penetrate into the volume 118. A sensor, e.g., a moisture sensor or pressure sensor, can be connected to the volume 118 via the bore 120, which sensor here can indicate failure of the seal effect of the seal element 110. Here the bore extends through the support element 114 and the housing 104.

From this point on the seal element 110 may possibly no longer be subjected to pressure, but may further act as a filter that can prevent abrasive particles from penetrating further.

Subsequently the further seal 146-2 can be subjected to pressure, hold the water back, and consequently begin to wear. Since particles in the water are further held back from the volume 118 by the seal element 110, under certain circumstances the further seal 146-2 can hold longer than the seal element 110. With a reduced operating speed a service live of the further seal 146-2 can be increased even further. In the event that wear nevertheless occurs, or an established effect is lost, water can penetrate into the further volume 150-1. The penetrating through a further bore 154 can be detected using a further moisture sensor or pressure sensor. It can thus be determined when the further seal 146-2 fails. Accordingly when the further seal 146-1 fails the water can be prevented from penetrating into the space 102 by the second seal 126. A further penetration of water can also be measured here using a sensor, whereby an operator may better plan an exchange of seals. Depending on requirements the seal assembly 100-3 can be expanded as desired by additional support elements or seals.

Optionally leakage tanks can be connected to the volumes 150-1; 150-2; 150-3 and 118 by the additional bores 154-1; 154-2, and penetrated water may be guided back into a surrounding body of water (e.g., the sea or a river). The seals 110; 122; 126; 146-1, and 146-2 as well as the support elements 114; 148-1; 148-2 and 148-3 can be introduced from one side into the housing 104, or pushed onto the component 106, on which the cover plate 136 or 152 is mounted.

As mentioned some exemplary embodiments can be usable in conjunction with underwater applications. Thus some exemplary embodiments can relate to a turbine hub, which comprises a shaft for pivotably supporting a turbine blade of the turbine hub and the mentioned seal assembly 100-1; 100-2; 100-3. Here the shaft can correspond to the component 106 and be at rest with respect to an environment. Here the housing 104 can be connected to the turbine wheel and be rotatable with respect to the shaft. The seal element 110 of the seal assembly 100-1; 100-2; 100-3 seals against the shaft here using the seal lip 112. According to some exemplary embodiments it can be possible here for the seal assembly 100-1; 100-2; 100-3 to withstand radially acting forces on the shaft of the turbine blades, such as for example in marine current power plants or tide power plants. In underwater turbines or beyond, the seal assembly 100-1; 100-2; 100-3 also comprise, for example, a bearing for rotatable connection of the housing 104 to the component 106, which is configured to receive radially acting forces. This can be, for example, a cylindrical roller bearing, deep groove ball bearing, or tapered roller bearing (e.g., including two rows of truncated-cone-shaped rolling elements in back-to-back arrangement for producing an enlarged span.

Due to an improved compactness exemplary embodiments may save installation space. Due to built-in redundancies of seals a sealing effect may be improved. In addition, a simplified exchange of worn or damaged seals can be possible. An operating time of the seal assembly can be increased since seals can be exchanged with one another, and thus an operating life of the counter-surface can be increased since after exchange the seal lips of the seal abut on different locations than before. Due to the modular design, a desired expansion can be made possible depending on operator requirements.

In applications with an environmental pressure of up to 8 bar, or even higher pressures, an improvement of the reliability of the sealing effect against seawater in tide turbines can be made possible both for static components and rotating components. The sealing effect may even be maintained at maximum loads of a turbine blade. A protection against penetrating sediments or debris, or against escaping contaminants through lubricant can also be made possible. This can also be supported by a further cover plate or by a filter for blocking coarse particles.

Under certain circumstances exemplary embodiments can offer a solution for sealing of underwater applications with reduced expense. An optional introduction of sensors here can offer a possibility of recognizing leakages early and improving a monitoring of the seal assembly. Leakages can also optionally be fixed by the use of leakage tanks. Furthermore, in some exemplary embodiments the seals may be changed in location with low cost. A contact position of the seals to the counter-surface can furthermore be changed, and here an additional expense of components may be omitted.

The above-described exemplary embodiments represent only an illustration of the principles of the present invention. It is understood that modifications and variations of the arrangements and details described herein will be clear to other persons of skill in the art. It is therefore intended that the invention be defined only by the scope of the following patent claims, and not by the specific details which have been presented with reference to the description and the explanation of the exemplary embodiments.

The features disclosed in the foregoing description, the following claims, and the accompanying Figures can be meaningful and can be implemented both individually as well as in any combination for the realization of an exemplary embodiment in its various designs.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

REFERENCE NUMBER LIST

100-1; 100-2; 100-3 Seal assembly
102 Space
104 Housing
106 Component
108 Medium
110 Seal element
112 Seal lip
114 Support element
116 Further seal assembly
118 Volume
120 Bore
122 First seal
124 First seal body
126 Second seal
128 Second seal body
130 Body structure
132 First seal lip
134 Second seal lip
136 Cover plate
138 Undercut
140 Attachment device
142 Support surface
144 Undercut
146-1; 146-2 Further seals
148-1; 148-2; 148-3 Further support elements 150-1; 150-2; 150-3 Additional volumes
152 Further cover plates
154-1; 154-2 Additional bores
156-1; 156-2; 156-3 Projections

What is claimed is:

1. A seal assembly for sealing a space between a housing and a component against a liquid medium, comprising:
    a first seal element fixedly connectable to the housing, the first seal element including a first body structure located on the housing, a first seal lip is disposed on the first body structure, the first seal lip is movable at least in a radial direction, the first seal lip being disposed at a first angle with respect to the radial direction such that one elongated side of the first seal lip faces the component;
    a second seal element fixedly connectable to the housing, the second seal element including a second body structure located on the housing, a second seal lip is disposed on the second body structure, the second seal lip is movable at least in the radial direction, the second seal lip being disposed at a second angle with respect to the radial direction;
    a support element is disposed between and in contact with the first support body and the second support body, the support element overlying a portion of the one elongated side of the first seal lip, the support element having an axially extending section that overlies a portion of the second support structure without contacting the second seal lip, wherein the support element and the first seal element and the second seal element are configured such that a pressure exerted on the first seal lip by the liquid medium is transmittable in the radial direction to the first support element and such that a second pressure exerted on the second seal lip by the liquid medium is transmittable in the radial direction to the second support element, the first and second seal lips being free of any spring pressing the first and second seal lips against the component;
    the component or the support element and the housing defining a bore positioned axially over the support element or the component, respectively, the bore being axially spaced from each of the first and second seal lips;
    a third seal element fixedly connectable to the housing, the third seal element including a third body structure located on the housing, a third seal lip is disposed on the third body structure, the third seal lip is movable at least in the radial direction, the third seal lip being disposed at a third angle with respect to the radial direction, the third body structure being adjacent to and abutting the second body structure;
    the second seal lip and the third seal lip face in axially opposite direction from each other; and
    an axial extension of the third body structure or the second body structure is different than an axial extension of the first body structure.

2. The seal assembly according to claim 1, wherein the support element has a greater rigidity than a rigidity of the first and second seal elements.

3. The seal assembly according to claim 1, wherein the support element is formed one-piece with the housing.

4. The seal assembly according to claim 1, wherein the first and second seal lips each project radially beyond the support element.

5. The seal assembly according to claim 1, wherein the seal assembly delimits a volume accessible via, the bore which is configured to discharge a medium located in the volume.

6. The seal assembly according to claim 5, wherein the bore extends through the support element and the housing and positioned axially over the component.

7. The seal assembly according to claim 1, wherein the housing includes a radially extending support surface including an undercut for producing a friction-fit connection to the first body structure of the first seal element.

8. A turbine hub, comprising:
    a seal assembly according to claim 1;
    wherein the component is a shaft configured to pivotably support a turbine blade with respect to the turbine hub; and
    wherein the seal assembly seals against the shaft using the first and second seal lips.

9. The seal assembly accordingly to claim 1, wherein the support element is formed of metal.

* * * * *